United States Patent
Owashi et al.

[11] Patent Number: 6,135,652
[45] Date of Patent: Oct. 24, 2000

[54] CAMERA HAVING A LENS COVER

[75] Inventors: Masao Owashi, Yokohama; Hidenori Miyamoto, Urayasu, both of Japan

[73] Assignee: Nikon Corporation, Tokyo, Japan

[21] Appl. No.: 09/493,008

[22] Filed: Jan. 28, 2000

Related U.S. Application Data

[63] Continuation of application No. 08/985,081, Dec. 4, 1997, Pat. No. 6,036,376.

[30] Foreign Application Priority Data

Dec. 6, 1996 [JP] Japan ................................ 8-342481

[51] Int. Cl.[7] .................................................. G03B 17/04
[52] U.S. Cl. ............................................ 396/349; 396/448
[58] Field of Search ..................................... 396/349, 448, 396/535

[56] References Cited

U.S. PATENT DOCUMENTS

| 4,219,265 | 8/1980 | Waaske . |
| 5,508,769 | 4/1996 | Inoue et al. . |
| 5,797,047 | 8/1998 | Ando et al. . |
| 5,805,947 | 9/1998 | Miyamoto et al. . |
| 6,036,376 | 3/2000 | Owashi et al. ........................ 396/349 |

*Primary Examiner*—David M. Gray

[57] ABSTRACT

A camera having a slide cover is disclosed. The camera is provided with the lens cover moving to a covering position where a photographing lens is covered, and to an opening position where the lens cover is opened from the front face of the photographing lens, and a guide member which guides the lens cover, the guide member having a step in an optical axis direction of the photographing lens between the covering position and the opening position.

2 Claims, 6 Drawing Sheets

CAMERA HAVING A LENS COVER

This application is a continuation of application No. 08/985,081, filed Dec. 4, 1997, now U.S. Pat. No. 6,036,376.

The entire disclosure of Japanese Patent Application No. 8-342481 including the specification, claims, drawings, and summary is incorporated herein by reference.

BACKGROUND OF THE INVENTION

1. Field of the Invention

The present invention relates to a camera having a lens cover.

2. Related Background Art

FIGS. 5 and 6 illustrate a shape of a conventional camera of full cover type. FIG. 5 shows a state that the cover is closed fully, and FIG. 6 shows a state that the cover is opened fully.

A slide cover 51 moves linearly along the groove 53 provided on an upper face and a lower face of a camera body 52, that is, moves to the state of covering a lens 50 (fully closed state) and to the state of opening the lens 50 (fully opened state).

In the fully closed state of the slide cover 51 in FIG. 5, a step is produced between the slide cover 51 and a grip portion 52a of the camera body 52, so that the camera body 52 must be thinned correspondingly to the thickness of the slide cover 51. For this reason, the space in the camera is reduced, on the contrary, if the internal space of the grip portion 52a is kept, the thickness of the camera is increased. Thus, there is yet room for improvement in these points.

SUMMARY OF THE INVENTION

An object of the invention is to provide a camera having a front face of the camera which is made fully flat when it is not used, and having a thickness of the body which thinned in the state that it is not used and the internal space is kept on the grip side.

In order to achieve the above object, according to the invention, there is provided a camera having a slide cover, comprising the lens cover moving to a covering position where a photographing lens is covered, and to an opening position where the lens cover is opened from the front face of the photographing lens, and a guide member which guides the lens cover, the guide member having a step in an optical axis direction of the photographing lens between the covering position and the opening position.

The guide member is a groove formed in at least one of an upper face and a lower face of a camera body, and the lens cover is slidably moved while being guided by the groove. Alternatively, the guide member is a protrusion formed in at least one of an upper face and a lower face of a camera body, and the lens cover is slidably moved while being guided by the protrusion.

Preferably, the step is made such that the opening position protrudes more than the covering position toward a side of an object to be photographed.

The above and other objects, features and advantages of the present invention will be explained hereinafter and may be better understood by reference to the drawings and the descriptive matter which follows.

DETAILED DESCRIPTION OF THE PREFERRED EMBODIMENTS

Figure 1:
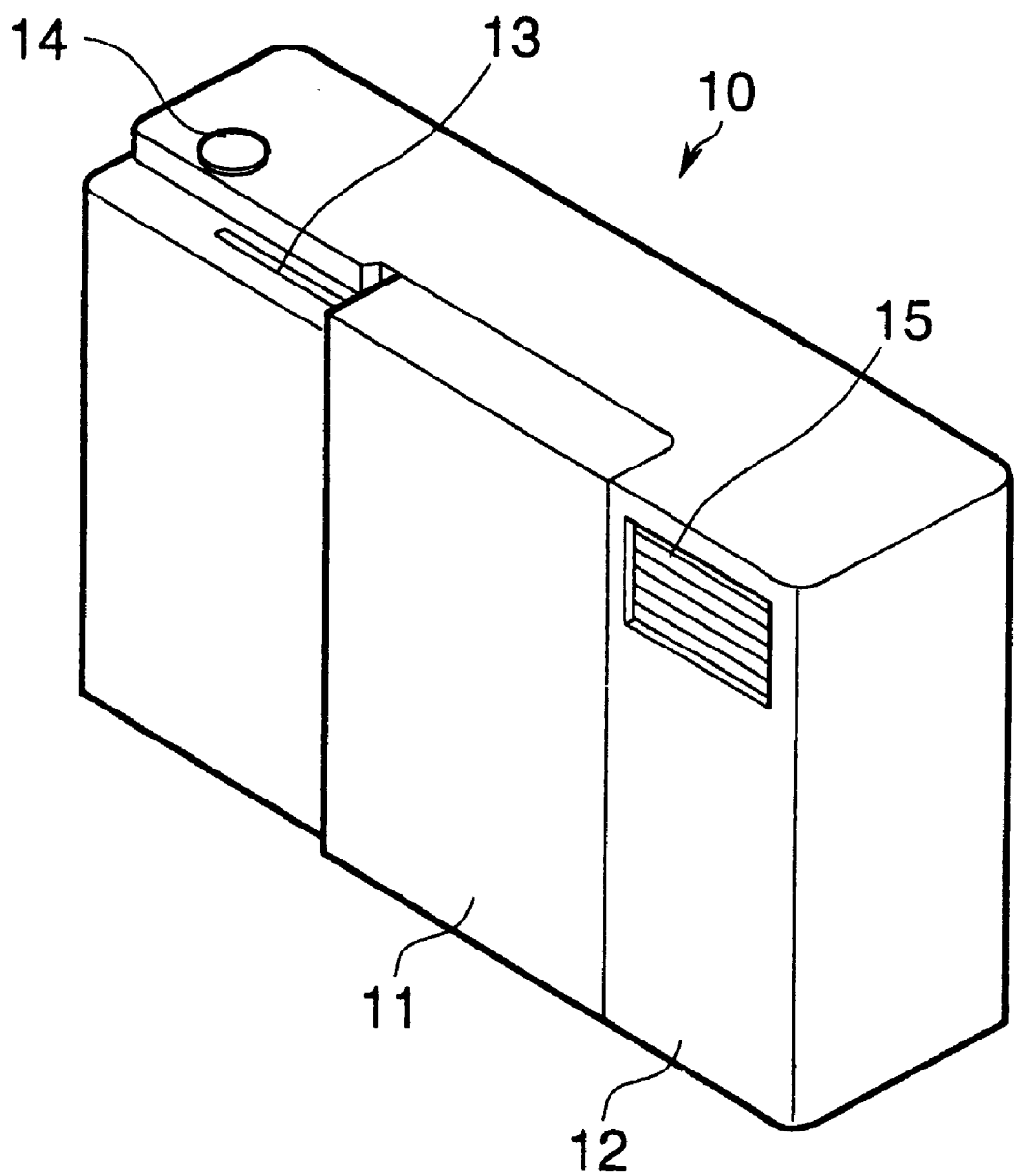
FIG. 1 is a perspective view showing an embodiment of the camera having the lens cover according to the invention.
Figure 2:
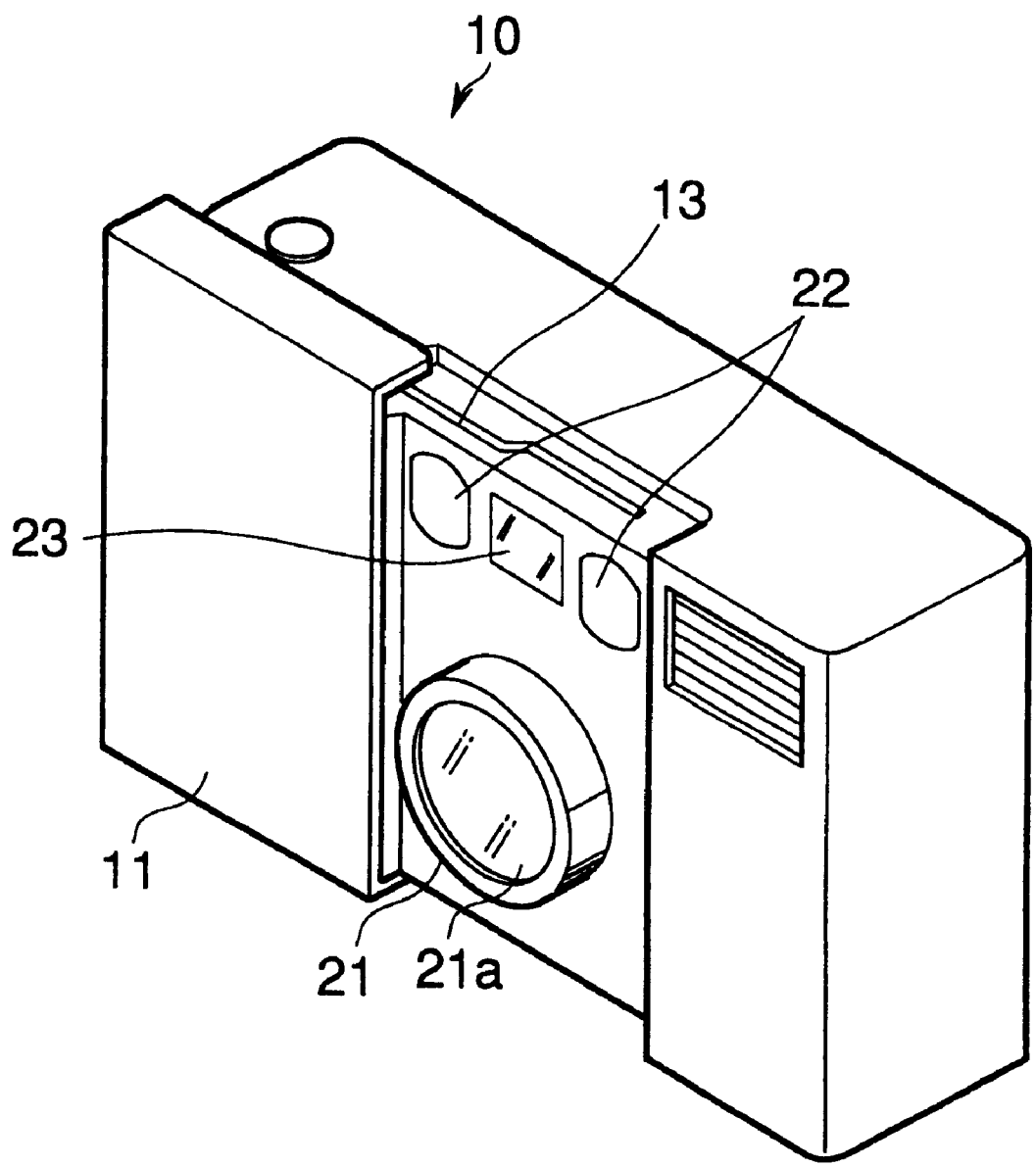
FIG. 2 is a perspective view showing the embodiment of the camera having the lens cover according to the invention.

FIGS. 1 and 2 are perspective views showing one embodiment of the camera having a lens cover according to the invention. FIG. 1 illustrates a state that a cover is fully closed, and FIG. 2 illustrates a state that the cover is fully opened.

In FIGS. 1 and 2, a slide cover 11 in the camera 10 moves along guide grooves 13 each provided in an upper face and a lower face of a camera body 12. That is, the slide cover 11 is guided by the guide grooves 13, and moves to the state of covering a photographing lens 21a (fully closed state) and to the state of opening the photographing lens 21a (fully opened state).

The camera 10 is provided with a release button 14, a flash 15, a lens barrel 21, automatic focusing windows 22, and a finder window 23.

Figure 3:
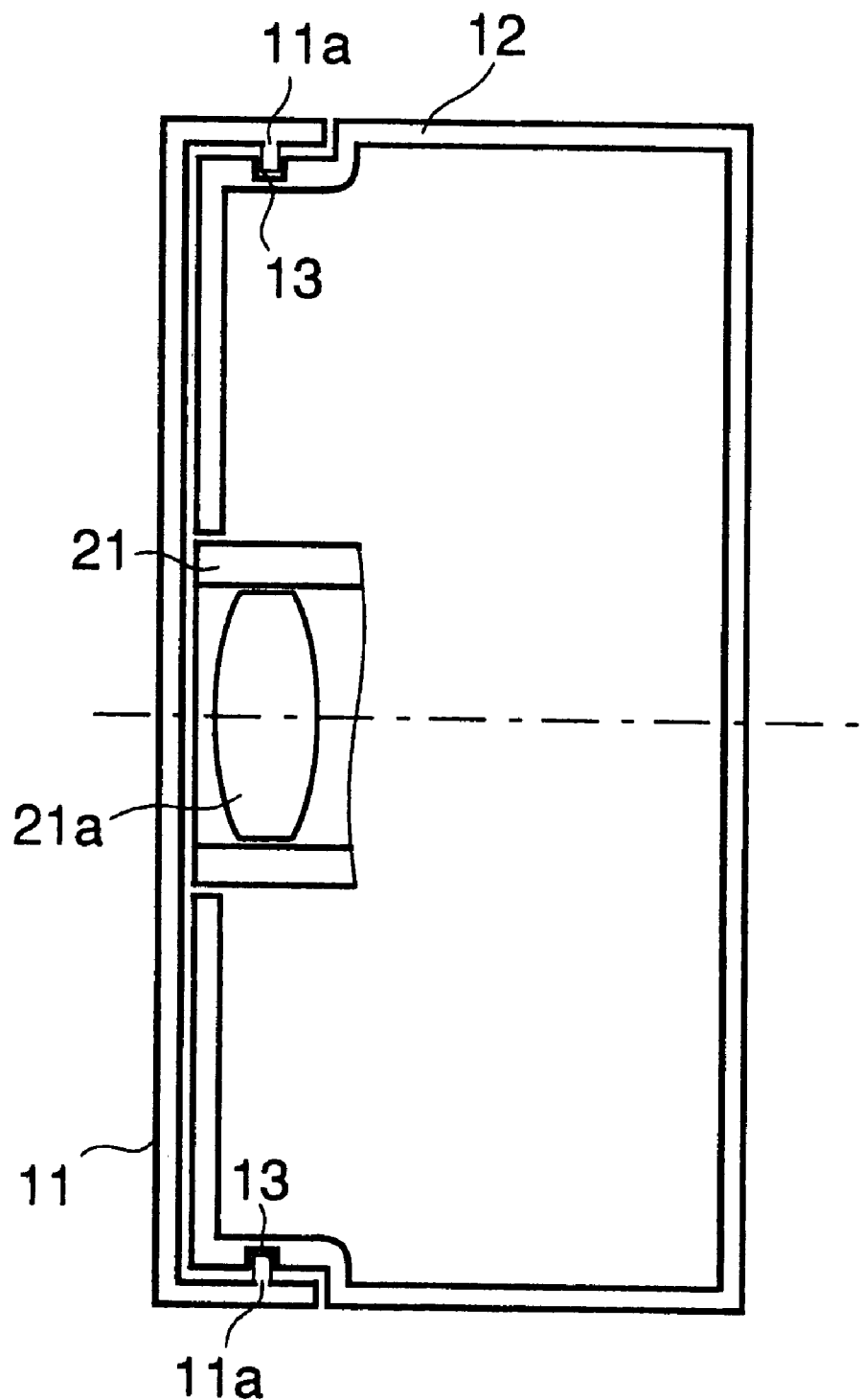
FIG. 3 is a cross-sectional view showing the embodiment of the camera having the lens cover according to the invention.

FIG. 3 is a cross-sectional view showing the central longitudinal cross section. Guide pins 11a protruding at the inside of the slide cover 11 engage in above and below directions with the guide grooves 13 provided in the upper face and the lower face of the camera body 13. Thus, the slide cover 11 moves while the slide cover 11 is guided by the guide grooves 13 without getting out of the guide grooves 13.

Figure 4A:
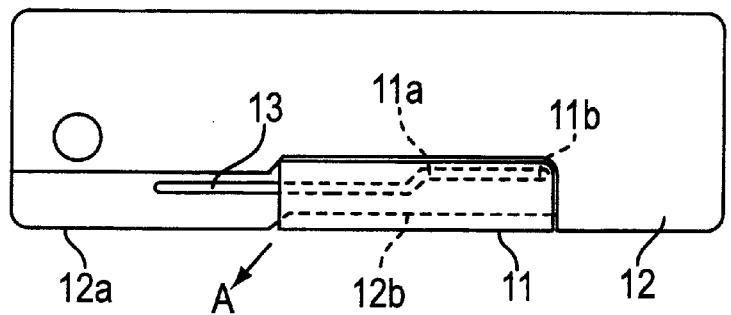
FIGS. 4A, 4B and 4C are upper plane views showing the embodiment of the camera having the lens cover according to the invention.
Figure 4B:
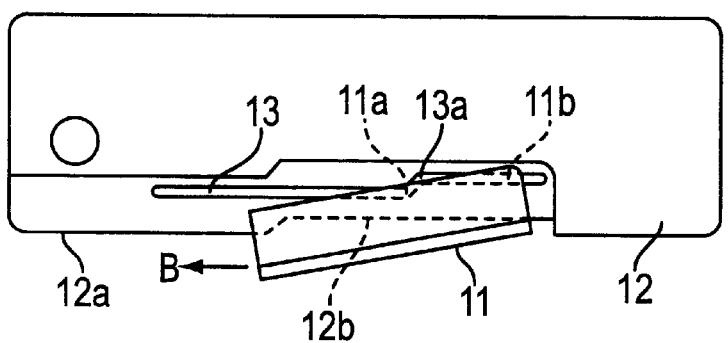
Figure 4C:
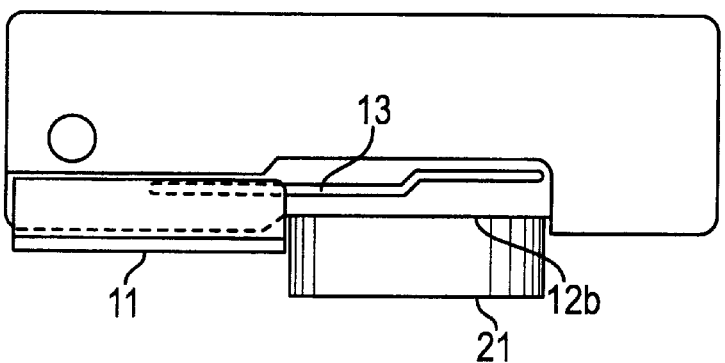
Figure 5:
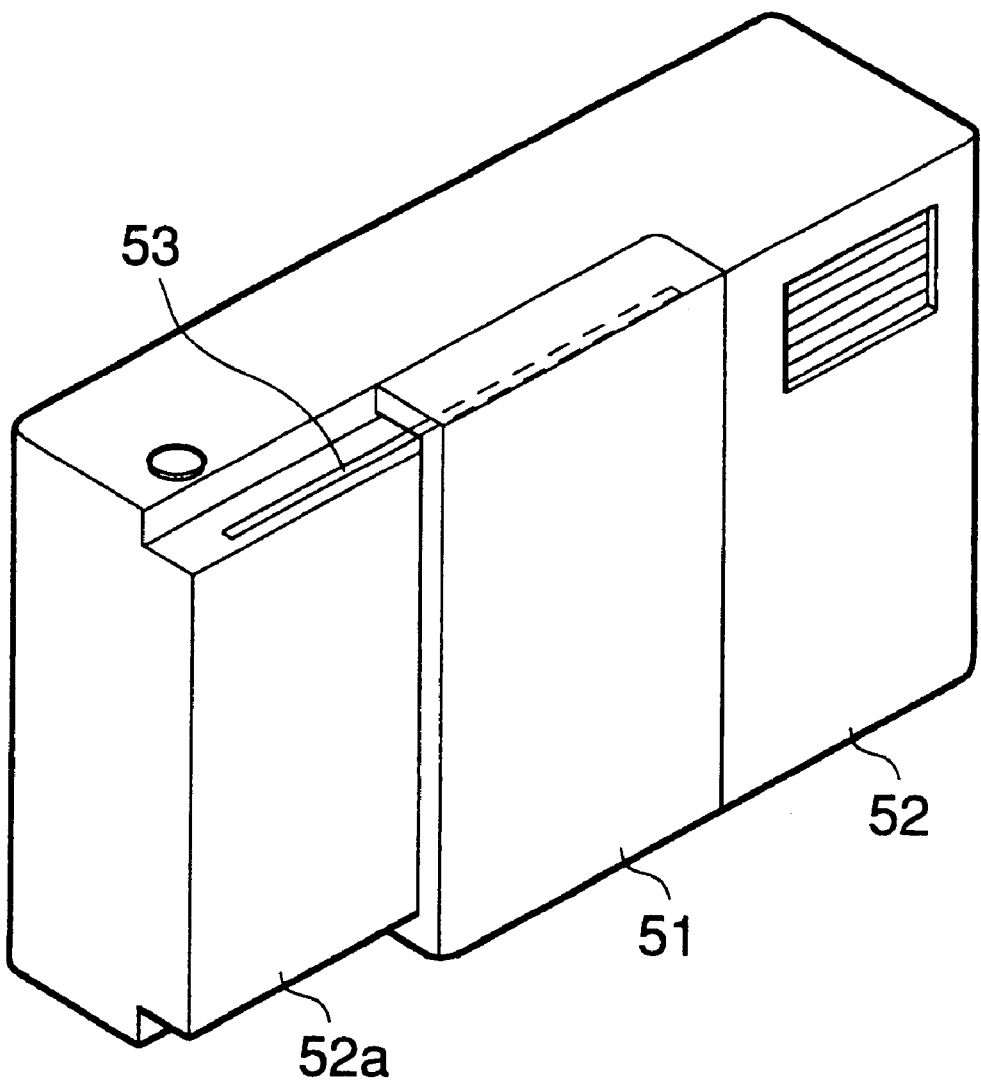
FIG. 5 is a perspective view showing an example of the conventional camera having a lens cover.
Figure 6:
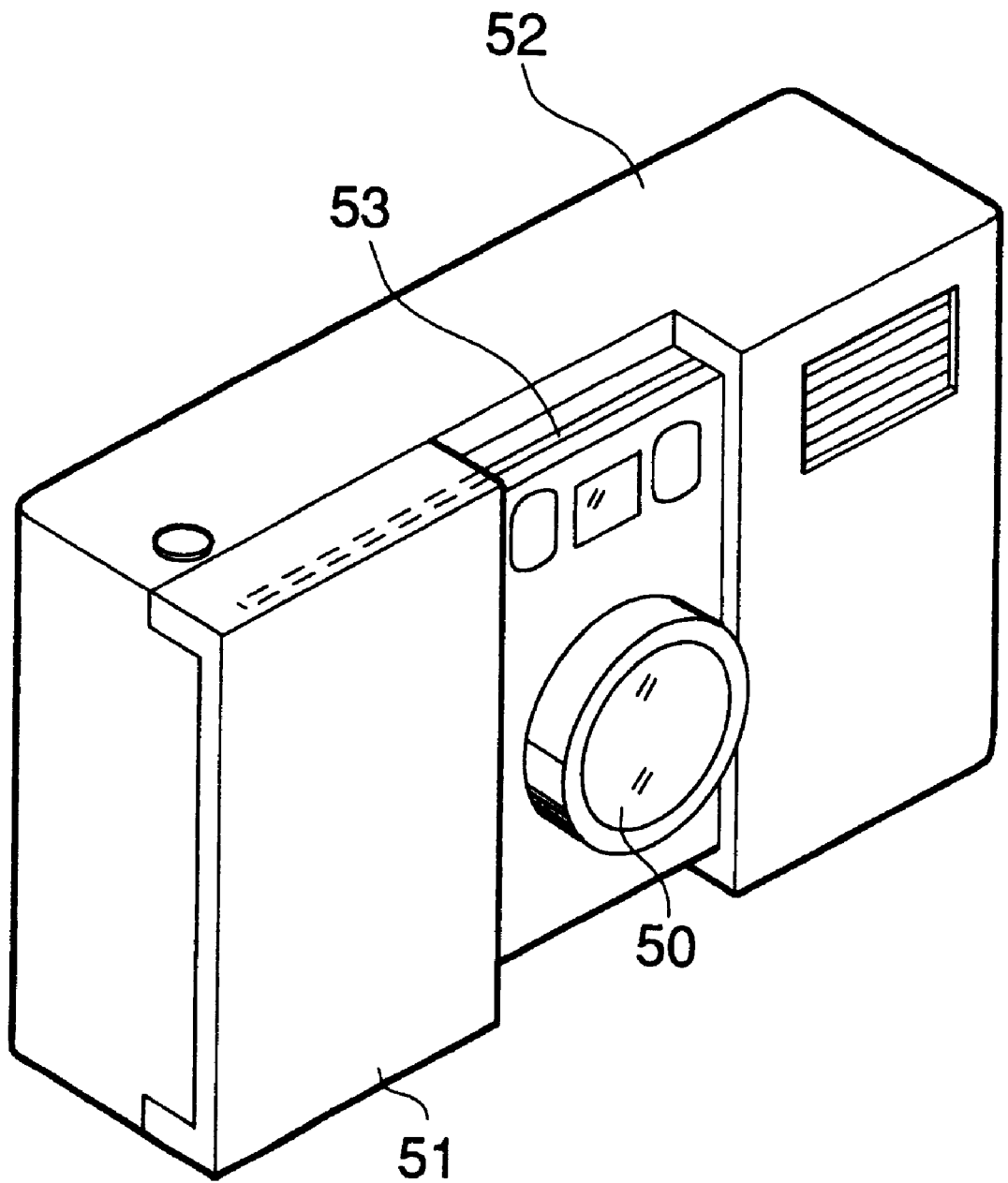
FIG. 6 is a perspective view showing the example of the conventional camera having a lens cover.

FIGS. 4A to 4C are upper plane views, illustrating the opening/closing operation of the slide cover 11.

FIG. 4A shows a state that the camera is not used, that is, the fully closed state of the slide cover 11. The guide pins 11a and 11b protruding from the slide cover 11 engage with the guide groove 13. In this state, the front face of the camera maintains such a state that there is no step between the slide cover 11, the surface of the adjacent camera body 12 and the grip portion 12a, that is, is formed as full flat form.

As shown in FIG. 4A, when the slide cover 11 is in the fully closed state, a rear surface of the slide cover 11 faces a first portion 12b of the camera body front surface.

FIG. 4B shows a state that the slide cover 11 has slid midway. When the slide cover 11 slides in a direction of arrow A from the state in FIG. 4A, then the guide pin 11a moves along the form of a curved portion 13a of the guide groove 13, and the slide cover 11 moves such that the front end thereof in the moving direction may float from the body 12 as shown in FIG. 4B. The slide cover 11 further slides in a direction of arrow B that is, in a direction perpendicular to, or substantially perpendicular to an optical axis direction, then the slide cover 11 comes to such a state as shown in FIG. 4C.

FIG. 4C shows the fully opened state of the slide cover 11. When it is detected by a switch (not shown) that the slide cover 11 has been fully opened, the lens barrel 21 is driven forward by a driving mechanism (not shown). In the fully opened state of the slide cover 11, since the automatic focusing windows 22 and the finder window 23 are exposed as shown in FIG. 2, the camera comes to a usable state (photographing state). In this state, the slide cover 11 functions as a grip of the camera body.

As shown in FIG. 4C, when the slide cover 11 is in the fully opened state, the rear surface of the slide cover 11 faces the grip portion 12a of the camera body front surface, which projects in an optical axis direction beyond the first portion 12b of the camera body front surface.

When the slide cover 11 is closed, it can be performed by the reverse operation to that mentioned above. That is, the slide cover 11 returns to the fully closed state in FIG. 4A by way of the state in FIG. 4B.

In the aforesaid embodiment, it is the groove 13 that guides the slide cover 11, but a protrusion (rail) may by used instead of the groove further the other guide member may be used.

As mentioned above, according to the camera having the slide cover in the invention, since the guide member has a step in an optical axis direction of the photographing lens between the covering position and the opening position, the front face of the camera can be made fully flat when the camera is not in use. Also, the internal space in the side of the grip can be maintained while the maximum thickness of the body is not increased in the state that the camera is not used. Further, since the thickness of the grip portion can be thickened upon use of the camera, the advantage that the camera body is easy in gripping can be attained.

What is claimed is:

1. A camera, comprising:

a cover movable between a closed position at which the cover covers an area in front of at least a photographing lens, and an open position in front of a front cover of the camera;

a guide device to guide the cover to retract in an optical axis direction as the cover moves from the open position to the closed position, the guide device comprising of a first portion perpendicular to the optical axis direction, a second portion inclined relative to the optical axis and a third portion perpendicular to the optical axis;

a first follower device which is provided on the cover and is engaged with the guide device; and a second follower device which is provided on the cover and is engaged with the guide device, wherein the first and second follower devices are aligned in a direction along which the cover moves, and a spacing therebetween is larger than a length of the second portion of the guide device.

2. A camera as recited in claim 1, wherein the guide device comprises a pair of guide grooves, and the first and second follower devices comprise of first and second pairs of guide pins, respectively.

* * * * *